United States Patent
Osada

(10) Patent No.: US 12,535,025 B2
(45) Date of Patent: Jan. 27, 2026

(54) EXHAUST TREATMENT APPARATUS

(71) Applicant: Isuzu Motors Limited, Yokohama (JP)

(72) Inventor: Katsushi Osada, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 19/052,456

(22) Filed: Feb. 13, 2025

(65) Prior Publication Data

US 2025/0264048 A1 Aug. 21, 2025

(30) Foreign Application Priority Data

Feb. 16, 2024 (JP) ................. 2024-022169

(51) Int. Cl.
*F01N 3/28* (2006.01)
*F01N 3/20* (2006.01)

(52) U.S. Cl.
CPC ............. *F01N 3/28* (2013.01); *F01N 3/208* (2013.01)

(58) Field of Classification Search
CPC .......... F01N 3/208; F01N 3/28; F01N 3/2892; F01N 2240/20; F01N 2610/1453
See application file for complete search history.

(56) References Cited

U.S. PATENT DOCUMENTS

| | | | | |
|---|---|---|---|---|
| 9,604,170 | B2* | 3/2017 | Kimura | B01F 23/2132 |
| 2010/0257849 | A1* | 10/2010 | Kowada | F01N 3/035 |
| | | | | 60/297 |
| 2011/0308234 | A1* | 12/2011 | De Rudder | F01N 3/2066 |
| | | | | 60/301 |
| 2012/0144812 | A1* | 6/2012 | Hyun | B01F 25/25 |
| | | | | 60/301 |
| 2015/0101311 | A1* | 4/2015 | Keen | F01N 13/143 |
| | | | | 60/274 |
| 2015/0202569 | A1* | 7/2015 | Kimura | F01N 3/2892 |
| | | | | 422/148 |
| 2016/0129397 | A1 | 5/2016 | Lee et al. | |
| 2019/0323397 | A1* | 10/2019 | Pill | F01N 3/2892 |

FOREIGN PATENT DOCUMENTS

| | | | | |
|---|---|---|---|---|
| CN | 104234792 A | * | 12/2014 | ............ F01N 3/28 |
| CN | 104755715 A | * | 7/2015 | ......... F01N 3/2066 |
| CN | 116576005 A | * | 8/2023 | ............ F01N 3/28 |
| CN | 117627754 A | * | 3/2024 | ......... F01N 13/18 |
| DE | 102022132123 A1 | * | 6/2024 | ......... F01N 3/035 |
| JP | 2014-055594 | | 3/2014 | |
| JP | 2016-528424 | | 9/2016 | |
| JP | 2018-123788 | | 8/2018 | |

* cited by examiner

*Primary Examiner* — Ngoc T Nguyen

(57) ABSTRACT

An exhaust treatment apparatus for reducing nitrogen oxides contained in exhaust gas discharged from an internal combustion engine, the exhaust treatment apparatus including: a chamber that includes a cylindrical wall and includes one-side end and another-side end in a cylinder-axis direction, the one-side end including an inlet port for introducing the exhaust gas, the another-side end being closed; a pipe that includes: a pipe peripheral wall; an inlet provided in one-side portion of a pipe axis; and an outlet provided in another-side portion of the pipe axis and positioned outside the chamber, the pipe being disposed so that a circumferential space is formed between the cylindrical wall and the pipe peripheral wall; an injector that injects a reducing agent toward the circumferential space; and a guide plate that guides the exhaust gas and the injected reducing agent from a side of the circumferential space toward the inlet.

6 Claims, 10 Drawing Sheets

EXHAUST TREATMENT APPARATUS

CROSS REFERENCE TO RELATED APPLICATIONS

This application claims the benefit of priority of Japanese Patent Application No. 2024-022169, filed on Feb. 16, 2024, the disclosure of which including the specification, drawings and abstract is incorporated herein by reference in its entirety.

TECHNICAL FIELD

The present disclosure relates to an exhaust treatment apparatus.

BACKGROUND ART

An exhaust treatment apparatus for treating particulate matter (PM) and nitrogen oxides (NOx) contained in exhaust gas discharged from an internal combustion engine is known. For example, an exhaust treatment apparatus in which nitrogen oxides contained in exhaust gas are reduced by mixing the exhaust gas with a urea solution as a reducing agent is called a urea selective catalytic reduction apparatus (Selective Catalytic Reduction (SCR)).

Patent Literature (hereinafter, referred to as PTL) 1 discloses an exhaust gas purifying apparatus including: an exhaust passage extending from a combustion chamber of an engine; a reducing agent injector that injects a reducing agent into the exhaust gas in the exhaust passage; a reduction catalyst main body that purifies nitrogen oxides in the exhaust gas by the reducing agent or a substance generated from the reducing agent; an impactor that divides an inside of the exhaust passage into a first space on an inner side and a second space on an outer side with a cylindrical partition wall; and a mixer disposed between the impactor and the reduction catalyst main body and having a protruding piece protruding inward from an inner surface of the exhaust passage, in which an injection direction of the reducing agent by the reducing agent injector is directed to an injection target portion set on a surface of the partition wall on a side of the first space.

Further, PTL 2 discloses a reducing agent pyrolysis system for a selective catalytic reduction apparatus, the reducing agent pyrolysis system comprising: an elbow duct that is provided in an exhaust duct at a front end of a reactor, allows exhaust gas to flow thereinto, and discharges the flowing exhaust gas toward the reactor; an inner pipe unit that is disposed in the elbow duct, and allows a part of the exhaust gas to flow into and be discharged from the inner pipe unit; a heating device that is provided in the inner pipe unit, and heats the exhaust gas flowing into the inner pipe unit; and a nozzle that is provided in the inner pipe unit, is disposed at a rear end of the heating device based on a flow of the exhaust gas, and injects a reducing agent into the inner pipe unit.

Further, PTL 3 discloses a nitrogen oxide removing apparatus including: an exhaust pipe that derives exhaust gas of an engine to a supercharger turbine; a dynamic pressure generator that extracts a part of the exhaust gas flowing through the exhaust pipe; a reducing agent supplier that mixes the extracted gas with a reducing agent and supplies the mixed gas to the exhaust pipe; and an SCR reactor that is connected to a rear end of the supercharger turbine and removes nitrogen oxides contained in the exhaust gas through a catalytic reduction reaction using the reducing agent, in which the extracted gas and the reducing agent provided to the exhaust pipe are sequentially guided to the supercharger turbine and the SCR reactor through the exhaust pipe.

CITATION LIST

Patent Literature

PTL 1
  Japanese Patent Application Laid-Open No. 2018-123788
PTL 2
  Japanese Unexamined Patent Application Publication (Translation of PCT Application) No. 2016-528424
PTL 3
  Japanese Patent Application Laid-Open No. 2014-55594

SUMMARY OF INVENTION

Technical Problem

Incidentally, in the invention described in PTL 1, the impactor is continuously heated by the heat of the exhaust gas passing through the second space on the outer side, thereby promoting the evaporative decomposition of the reducing agent injected into the first space. However, there is room for improvement in efficiently promoting the evaporative decomposition of the reducing agent.

Furthermore, in the invention described in PTL 2, the inner pipe is continuously heated by the heat of the exhaust gas passing through the outside of the inner pipe, thereby promoting the evaporative decomposition of the reducing agent injected into the inner pipe. However, there is room for improvement in efficiently promoting the evaporative decomposition of the reducing agent.

In addition, in the invention described in PLT 3, the porous inner cylinder is continuously heated by the heat of the exhaust gas passing through the outside of the porous inner cylinder, thereby promoting the evaporative decomposition of the reducing agent injected into the porous cylinder. However, there is room for improvement in efficiently promoting the evaporative decomposition of the reducing agent.

An object of the present disclosure is to provide an exhaust treatment apparatus capable of efficiently promoting evaporative decomposition of a reducing agent.

Solution to Problem

To achieve the above object, an exhaust treatment apparatus according to the present disclosure is for reducing nitrogen oxides contained in exhaust gas by mixing, with a reducing agent, the exhaust gas discharged from an internal combustion engine, the exhaust treatment apparatus including: a chamber that includes a cylindrical wall extending in a cylinder-axis direction and includes one-side end and another-side end in the cylinder-axis direction, the one-side end including an inlet port for introducing the exhaust gas, the another-side end being closed; a pipe that includes: a pipe peripheral wall extending in a pipe-axis direction; an inlet provided in one-side portion of a pipe axis; and an outlet provided in another-side portion of the pipe axis and positioned outside the chamber, the pipe being disposed so that a circumferential space is formed between the cylindrical wall and the pipe peripheral wall by being surrounded by the cylindrical wall from an outside; an injector that injects the reducing agent toward the circumferential space; and a guide plate that guides the exhaust gas and the injected reducing agent from a side of the circumferential space toward the inlet.

Advantageous Effects of Invention

According to the present disclosure, it is possible to efficiently promote the evaporative decomposition of the reducing agent.

DESCRIPTION OF EMBODIMENTS

Figure 1:
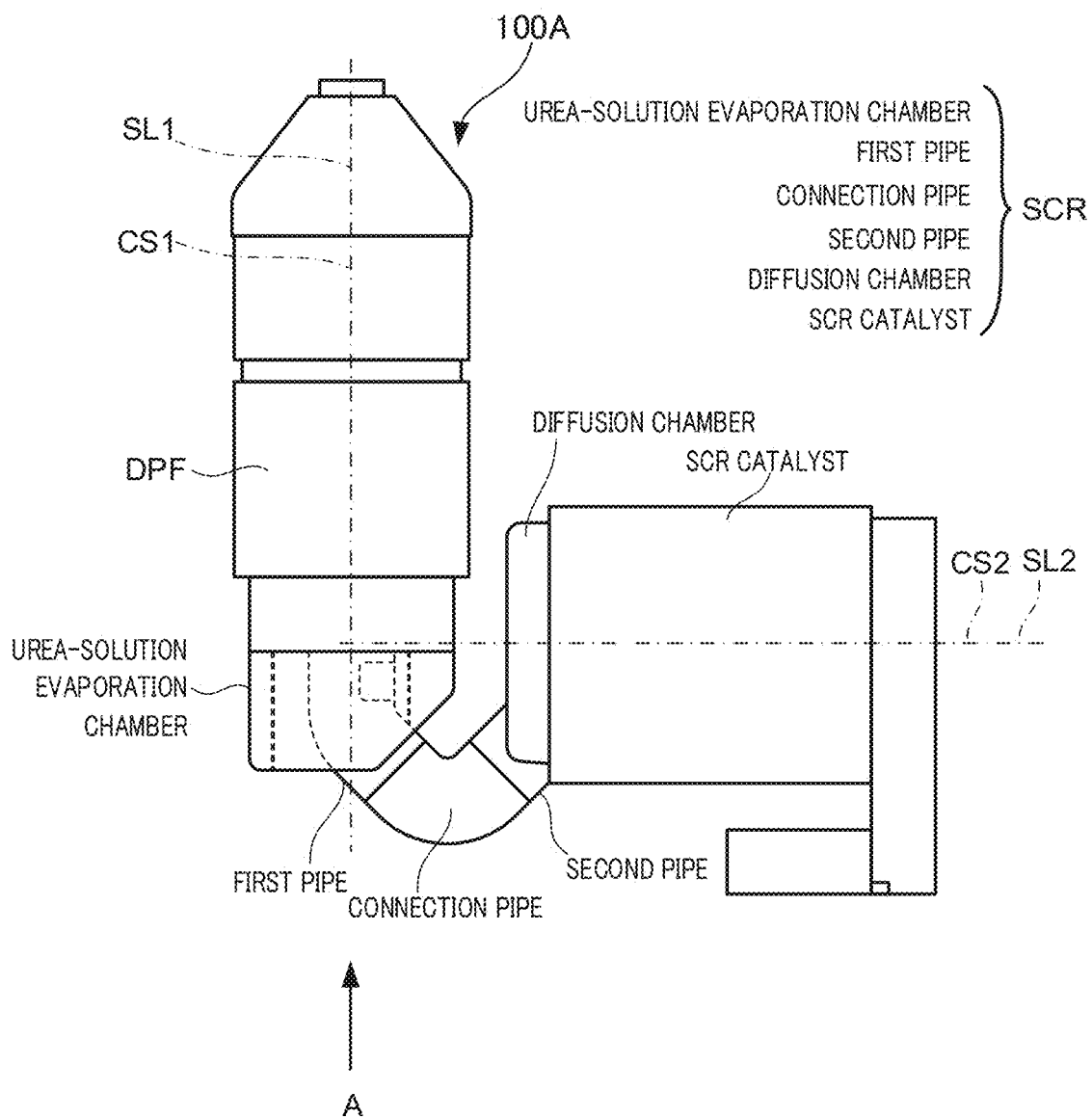
FIG. 1 is a diagram illustrating an exemplary layout of an aftertreatment system according to an embodiment of the present disclosure.
Figure 2:
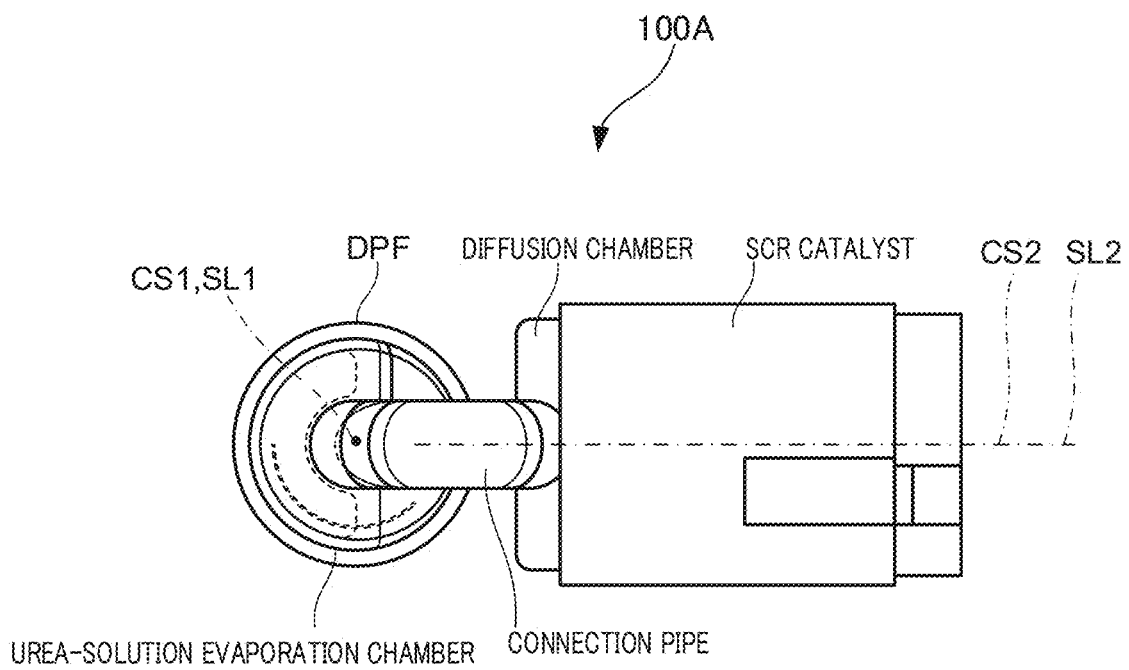
FIG. 2 is a view on arrow A of FIG. 1.

Hereinafter, an embodiment of the present disclosure will be described with reference to the drawings. FIG. 1 is a diagram illustrating an exemplary layout of an aftertreatment system according to the embodiment of the present disclosure. FIG. 2 is a view on arrow A of FIG. 1. Aftertreatment system 100A illustrated in FIGS. 1 and 2 includes a diesel particulate filter (DPF) and a selective catalytic reduction apparatus (SCR). The respective layouts of DPF and SCR are determined depending on the vehicle type. DPF collects and removes particulate matter (PM) in the exhaust gas discharged from an internal combustion engine. Note that aftertreatment system 100A may include a diesel oxidation catalyst (DOC) that is disposed on the upstream side of the exhaust of DPF, raises the temperature of the exhaust gas by oxidizing the fuel (HC) injected after the combustion process to promote combustion in DPF.

DPF includes a cylindrical wall extending in the cylinder-axis direction. The cylinder-axis direction is a direction extending along straight line SL1.

SCR is disposed on the downstream side of the exhaust of DPF, and reduces nitrogen oxides (NOx) contained in the exhaust gas by mixing, with a reducing agent, the exhaust gas in which PM has been collected and removed by DPF. A urea solution $((NH_2)_2CO)$ is used as the reducing agent mixed with the exhaust gas. The urea solution is decomposed into ammonia $(NH_3)$ by the heat of the exhaust gas. The ammonia produced by the decomposition of the urea solution reacts with nitrogen oxides $(NO_x)$. Through the above process, nitrogen oxides are reduced to nitrogen $(N_2)$ and water $(H_2O)$.

Exhaust treatment apparatus 100 (SCR) in the present embodiment includes a urea-solution evaporation chamber, a diffusion chamber, and an SCR catalyst. The respective layouts of the urea-solution evaporation chamber, the diffusion chamber, and the SCR catalyst are determined depending on the vehicle type. The urea-solution evaporation chamber, the diffusion chamber, and the SCR catalyst each have a cylindrical wall and a cylinder axis.

The urea-solution evaporation chamber is placed so that cylinder axis CS1 is along straight line SL1. The diffusion chamber and the SCR catalysts are each placed so that cylinder axis CS2 aligns with straight line SL2 orthogonal to straight line SL1. A first pipe located on the urea-solution evaporation chamber side and a second pipe located on the diffusion chamber side are connected to each other through a connection pipe. The urea-solution evaporation chamber promotes the decomposition of the urea solution. The diffusion chamber diffuses ammonia and nitrogen oxides contained in the exhaust gas. The SCR catalyst uses a hydrocarbon (HC) as a reducing agent. Thus, ammonia selectively reacts with nitrogen oxides in the exhaust gas to generate nitrogen and water.

Figure 3:
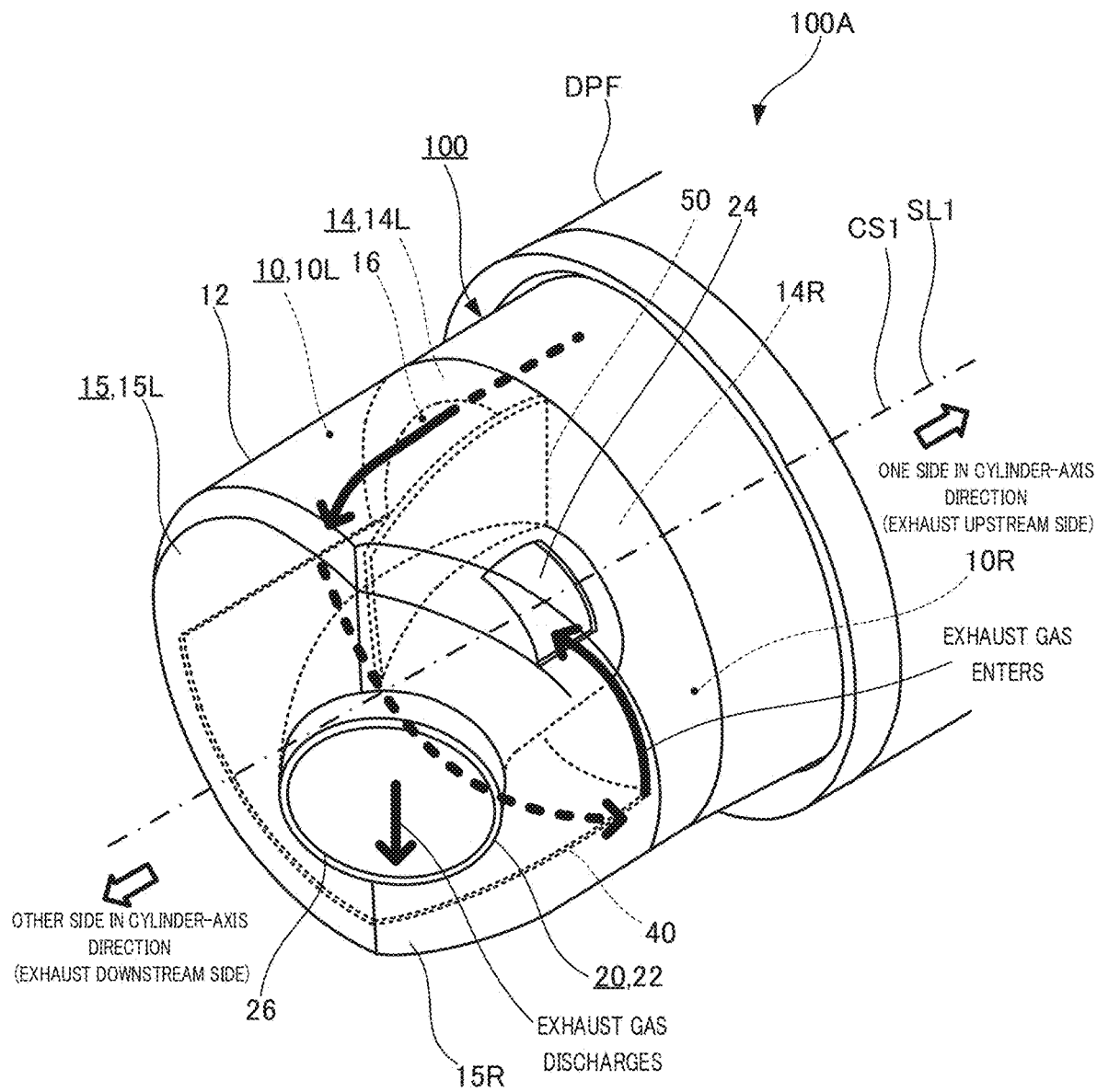
FIG. 3 is a perspective view of an exhaust treatment apparatus assembled to a diesel particulate filter according to the embodiment of the present disclosure.
Figure 4:
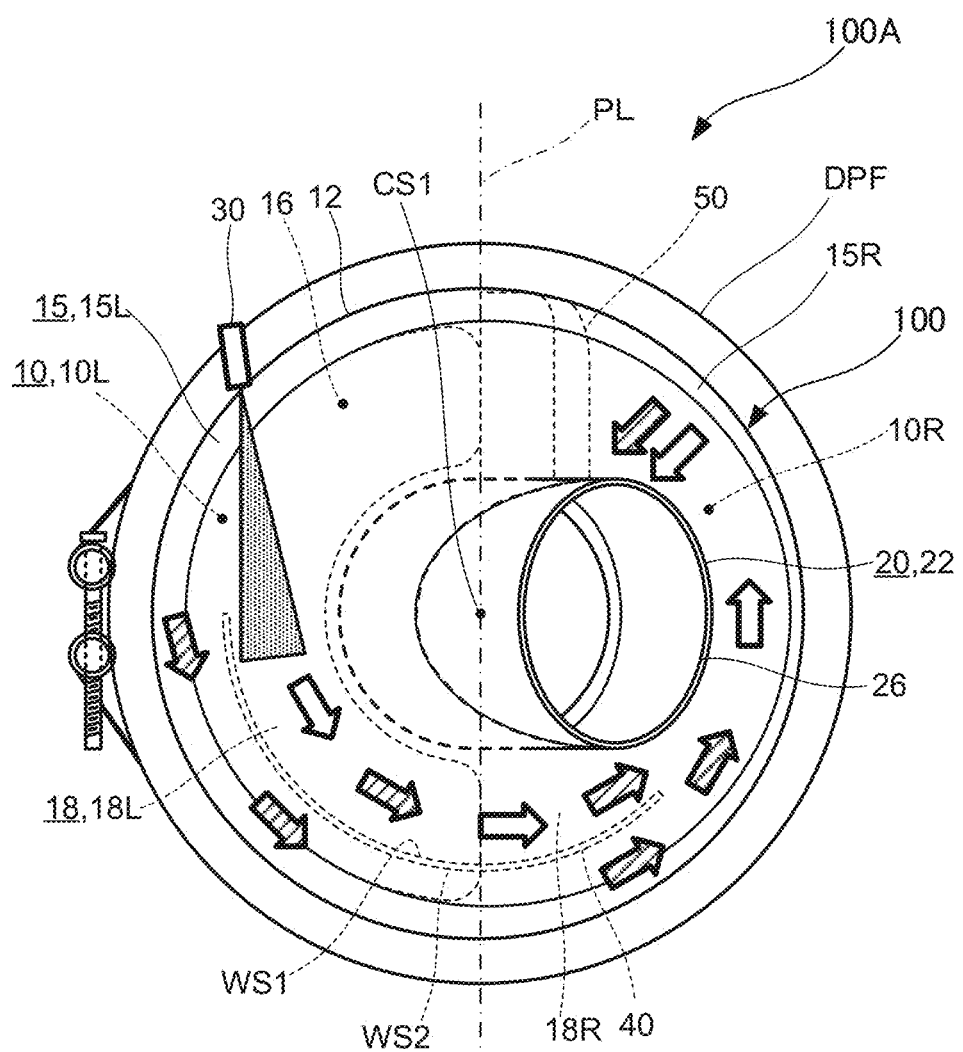
FIG. 4 is a front view of the exhaust treatment apparatus assembled to a diesel particulate filter according to the embodiment of the state disclosure.
Figure 5:
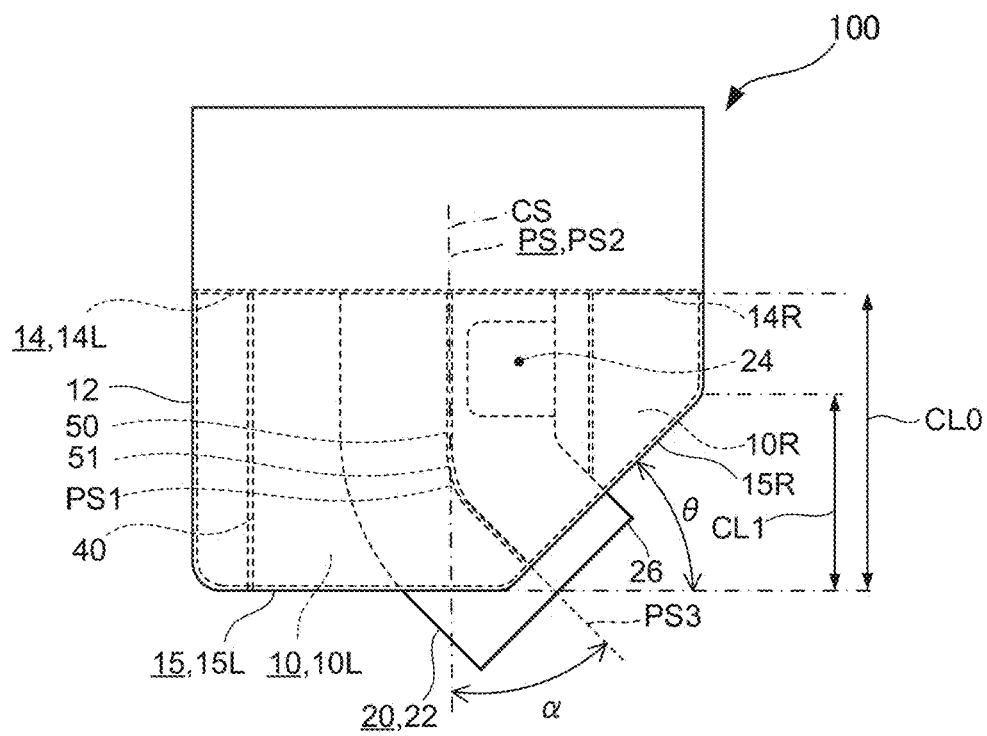
FIG. 5 is a plan view of the exhaust treatment apparatus according to the embodiment of the present disclosure.
Figure 6:
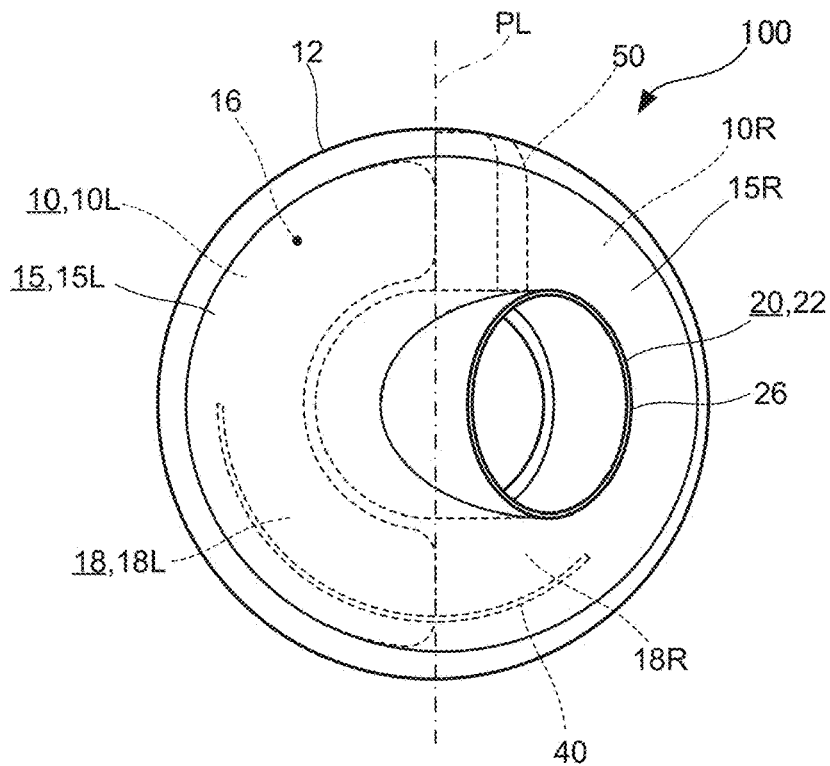
FIG. 6 is a front view of the exhaust treatment apparatus according to the embodiment of the present disclosure as viewed from an exhaust downstream side.
Figure 7:
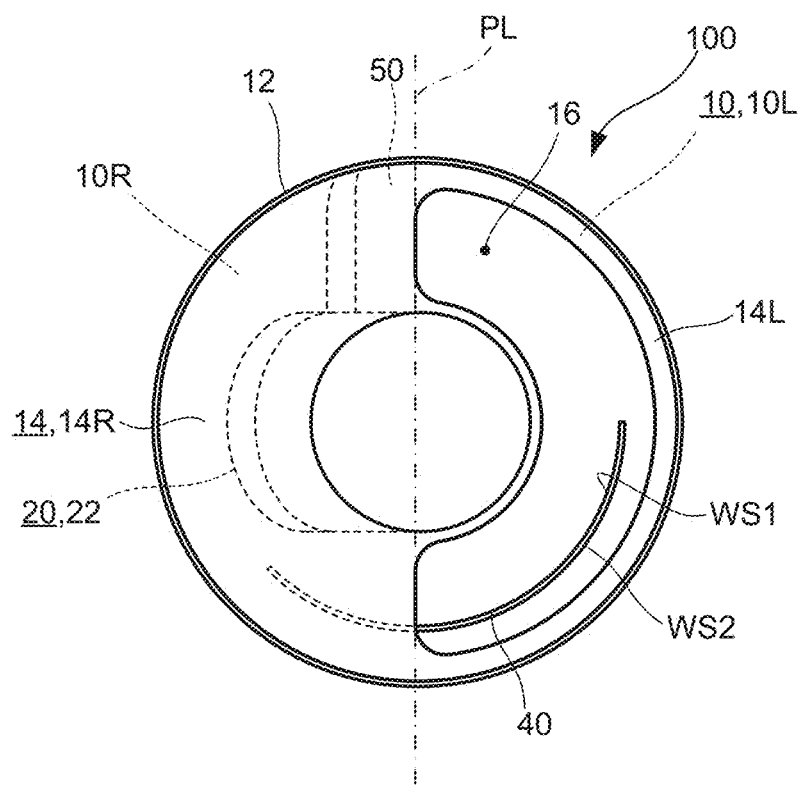
FIG. 7 is a rear view of the exhaust treatment apparatus according to the embodiment of the present disclosure as viewed from an exhaust upstream side.

In the present embodiment, a urea-solution evaporation chamber is exemplified as exhaust treatment apparatus 100. FIG. 3 is a perspective view of the exhaust treatment apparatus assembled to a DPF according to the present embodiment. FIG. 4 is a front view of the exhaust treatment apparatus assembled to the DPF according to the present embodiment. FIG. 5 is a plan view of the exhaust treatment apparatus according to the present embodiment. FIG. 6 is a front view of the exhaust treatment apparatus according to the present embodiment as viewed from the exhaust downstream side. FIG. 7 is a rear view of the exhaust treatment apparatus according to the present embodiment.

As illustrated in FIGS. 3 to 7, exhaust treatment apparatus 100 includes urea-solution evaporation chamber 10 (hereinafter, simply referred to as "chamber"), pipe 20, injector 30 (see FIG. 4), reducing agent evaporation plate 40, and guide plate 50. Note that pipe 20 corresponds to the first pipe disposed on the side of chamber 10 (urea-solution evaporation chamber).

(Chamber 10)

Chamber 10 includes cylindrical wall 12 formed of, for example, a stainless-steel pipe. In FIGS. 4 and 7, partitioning line PL extending vertically is shown by a two-dot chain line. In the following description, a cylinder-axis direction is sometimes referred to as an "exhaust direction." Furthermore, one side in the cylinder-axis direction is sometimes referred to as an "exhaust upstream side," and the other side in the cylinder-axis direction is sometimes referred to as an "exhaust downstream side." In addition, a direction orthogonal to the cylinder-axis direction is sometimes referred to as a "radial direction." Moreover, a direction radially apart from cylinder axis CS1 is sometimes referred to as a "radial-direction one side" or a "centrifugal direction," and a direction coming close to cylinder axis CS1 in the radial direction is sometimes referred to as a "radial-direction other side" or a "centripetal direction." Further, in FIG. 4 showing the front side of exhaust treatment apparatus 100, the rightward direction is sometimes referred to as a "right side," and the leftward direction is sometimes referred to as a "left side."

Chamber 10 includes one-side end wall 14 placed at an end on one side in the cylinder-axis direction (exhaust upstream side) and other-side end wall 15 placed at an end on the other side in the cylinder-axis direction (exhaust downstream side).

As illustrated in FIGS. 3, 5, and 7, one-side end wall 14 is divided into two regions: left wall 14L placed on the left side from partitioning line PL; and right wall 14R placed on the right side from partitioning line PL. Note that, in FIG. 7, which is a rear view of exhaust treatment apparatus 100, left wall 14L is illustrated on the right side from partitioning line PL, and right wall 14R is illustrated on the left side from partitioning line PL. One-side end wall 14 is a circular wall that extends radially about cylinder axis CS1. One-side end wall 14 is provided with inlet port 16 for introducing exhaust gas from a DPF side (not shown). Inlet port 16 is an arc-shaped opening that has a predetermined width in the radial direction and extends in a counterclockwise direction from the position of 12 o'clock to the position of 6 o'clock in one-side end wall 14, which is a circular wall.

As shown in FIGS. 3 to 6, other-side end wall 15 is divided into two regions: left wall 15L placed on the left side from partitioning line PL; and right wall 15R placed on the right side from the partitioning line. Other-side end wall 15 closes the end of chamber 10 on the other side in the cylinder-axis direction (exhaust downstream side). Left wall 15L has a wall surface extending radially from cylinder axis CS1 in a substantially semicircular shape. In other words, the wall surface of left wall 15L is a wall surface extending counterclockwise from the position of 12 o'clock to the position of 6 o'clock. Right wall 15R has a wall surface extending radially from cylinder axis CS1 in a substantially semicircular shape. In other words, the wall surface of right wall 15R is a wall surface extending counterclockwise from the position of 6 o'clock to the position of 12 o'clock. Further, the wall surface of right wall 15R is inclined at a predetermined angle θ toward one side in the cylinder-axis direction (exhaust upstream side) with respect to the wall surface of left wall 15L (see FIG. 5).

Chamber 10 is divided into two spaces: left chamber part 10L placed on the left side from partitioning line PL; and right chamber part 10R placed on the right side from partitioning line PL. The total length of left chamber part 10L in the cylinder-axis direction is constant length CL0 (see FIG. 5). Meanwhile, the total length of right chamber part 10R in the cylinder-axis direction gradually shortens from the position of 6 o'clock toward the position of 3 o'clock in a counterclockwise direction because the wall surface of right wall 15R is inclined toward one side in the cylinder-axis direction (exhaust upstream side) with respect to cylinder axis CS1. Specifically, the total length of right chamber part 10R in the cylinder-axis direction shortens from length CL0 to length CL1 (see FIG. 5). As a result, the cross-sectional area of right chamber part 10R (cross-sectional area of right chamber part 10R on a plane orthogonal to the cylinder-axis direction) is narrowed from the other side in the cylinder-axis direction toward the one side in the cylinder-axis direction.

(Pipe 20)

Figure 8:
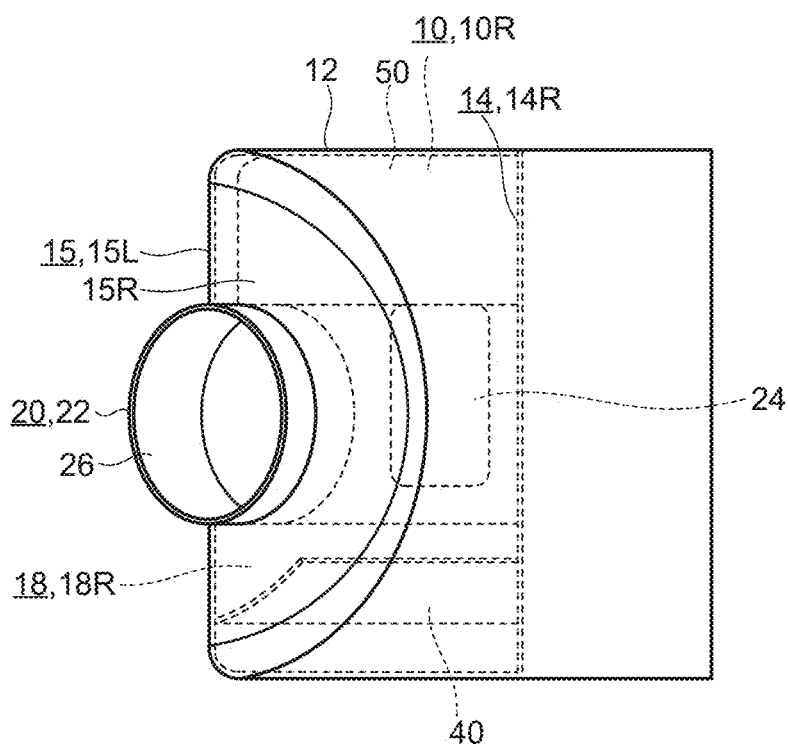
FIG. 8 is a right-side view of the exhaust treatment apparatus according to the embodiment of the present disclosure.
Figure 9:
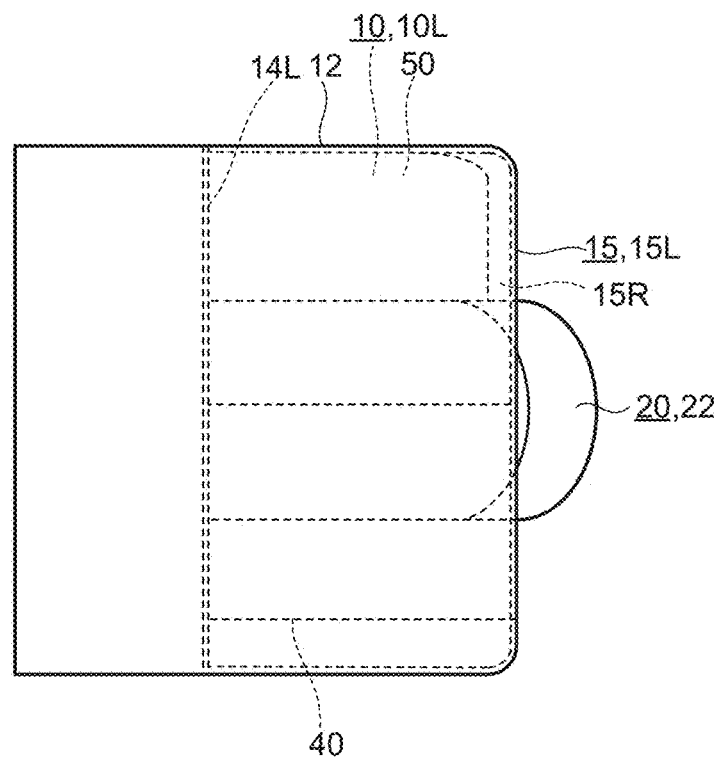
FIG. 9 is a left-side view of the exhaust treatment apparatus according to the embodiment of the present disclosure.

FIG. 8 is a right-side view of the exhaust treatment apparatus according to the present embodiment. FIG. 9 is a left-side view of the exhaust treatment apparatus according to the present embodiment. As illustrated in FIGS. 3 to 6, 8 and 9, pipe 20 includes pipe axis PS and pipe peripheral wall 22, and is formed of, for example, a stainless-steel pipe. Pipe axis PS is shown by a dashed line in FIG. 5. Pipe 20 includes bent part PS1 bent at the central part in the pipe-axis direction. Part PS2 on one side from bent part PS1 in the pipe-axis direction (pipe-axis-direction one-side part PS2) extends along cylinder axis CS1. Part PS3 on the other side from bent part PS1 in the pipe-axis direction (pipe-axis-direction other-side part PS3) extends in a direction inclined at a predetermined angle α with respect to cylinder axis CS1 (see FIG. 5). The inclination angle α of pipe-axis-direction other-side part PS3 with respect to cylinder axis CS1 corresponds to inclination angle θ of the wall surface of right wall 15R with respect to the wall surface of left wall 15L (α=θ).

One-side end of pipe 20 in the pipe-axis direction is a closed end blocked by one-side end wall 14. The other-side end of pipe 20 in the pipe-axis direction is an open end. Inlet 24 is provided in pipe peripheral wall 22 in pipe-axis-direction one-side part PS2. Outlet 26 is provided in pipe-axis-direction other-side part PS3 as an open end. Outlet 26 is placed outside chamber 10.

Pipe peripheral wall 22 is placed in such a manner that pipe peripheral wall 22 is surrounded by cylindrical wall 12 from the outside. This forms a circumferentially extending circumferential space 18 between pipe peripheral wall 22 and cylindrical wall 12. In the same manner as chamber 10 divided into two spaces by partitioning line PL, circumferential space 18 is also divided into two spaces: left circumferential space 18L (see FIG. 6) positioned on the left side from partitioning line PL; and right circumferential space 18R (see FIG. 6) positioned on the right side from partitioning line PL. In the same manner as the cross-sectional area of right chamber part 10R, the cross-sectional area of right circumferential space 18R is also narrowed from the other side toward the one side in the cylinder-axis direction. One side of left circumferential space 18L (exhaust upstream side) leads to inlet port 16. This allows the exhaust gas from DPF to be introduced into left circumferential space 18L through inlet port 16, and then the introduced exhaust gas can move from left circumferential space 18L to right circumferential space 18R. Furthermore, the exhaust gas that has moved to right circumferential space 18R can move from the other side in the cylinder-axis direction toward the one side in the cylinder-axis direction. That is, the exhaust gas from DPF can move from left circumferential space 18L toward the one side of right circumferential space 18R in the cylinder-axis direction. The direction of flow of the exhaust gas is indicated by a thick arrow in FIG. 3.

(Injector 30)

Injector 30 is disposed on cylindrical wall 12 in left chamber part 10L (see FIG. 4). The injection port of injector 30 is directed from the side of cylindrical wall 12 to left circumferential space 18L. This allows injector 30 to inject the reducing agent (urea solution) toward the exhaust gas introduced into left circumferential space 18L from inlet port 16. In FIG. 4, the direction of flow of the exhaust gas is indicated by a hatched arrow, and the direction of flow of the reducing agent is indicated by a white arrow.

(Reducing Agent Evaporation Plate 40)

Figure 10:
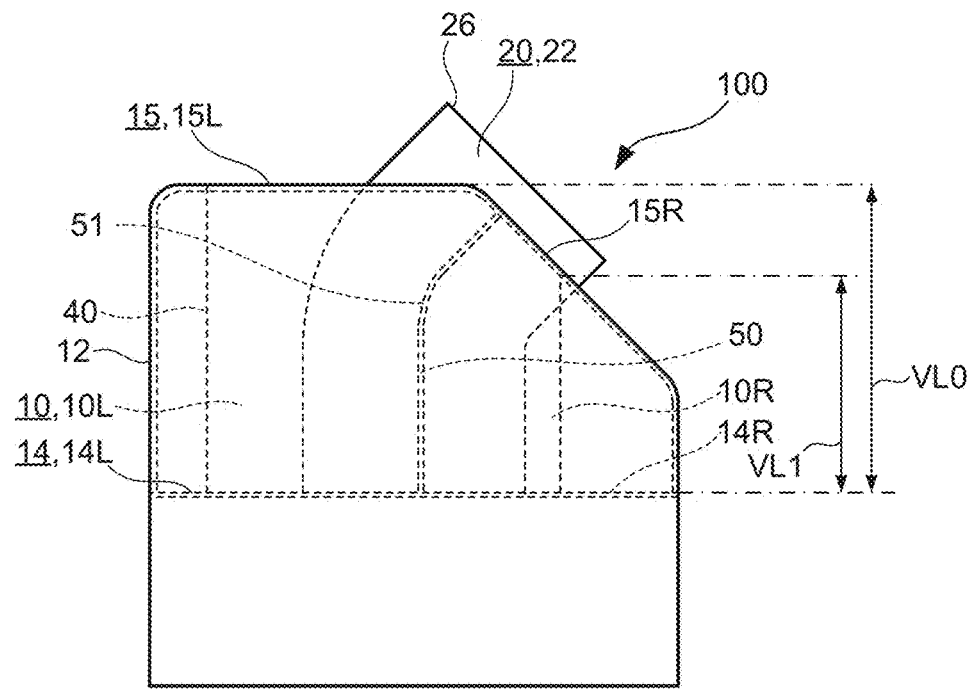
FIG. 10 is a bottom view of the exhaust treatment apparatus according to the embodiment of the present disclosure.

FIG. 10 is a bottom view of the exhaust treatment apparatus according to the present embodiment. As illustrated in FIGS. 3 to 10, reducing agent evaporation plate 40 is a flat plate member disposed along cylindrical wall 12 in circumferential space 18. Specifically, reducing agent evaporation plate 40 extends circumferentially in a counter-clockwise direction from the position of 9 o'clock to the position of 4 o'clock between cylindrical wall 12 and pipe peripheral wall 22. That is, reducing agent evaporation plate 40 extends circumferentially from left circumferential space 18L to right circumferential space 18R. In addition, reducing agent evaporation plate 40 includes inner wall surface WS1 facing pipe peripheral wall 22 and outer wall surface WS2 facing cylindrical wall 12. Inner wall surface WS1 is placed such that the reducing agent injected from injector 30 comes into contact with inner wall surface WS1. Exhaust gas and the reducing agent (urea solution) flow through the gap between pipe peripheral wall 22 and inner wall surface WS1. Exhaust gas flows through the gap between cylindrical wall 12 and outer wall surface WS2. This allows the reducing agent flowing through the gap between pipe peripheral wall 22 and inner wall surface WS1 to be decomposed into ammonia by the heat of the exhaust gas flowing through the gap between cylindrical wall 12 and outer wall surface WS2. Note that chamber 10 decomposes the reducing agent (urea solution) into ammonia by the heat of the exhaust gas, and is therefore referred to as a "urea-solution evaporation chamber."

The total length of reducing agent evaporation plate 40 in left circumferential space 18L in the cylinder-axis direction is constant length VL0 (see FIG. 10). Similarly to the total length of right chamber part 10R in the cylinder-axis direction, the total length of reducing agent evaporation plate 40 in right circumferential space 18R in the cylinder-axis direction gradually shortens from the position of 6 o'clock to the position of 4 o'clock in the counterclockwise direction because the wall surface of right wall 15R is inclined to one side in the cylinder-axis direction (the exhaust upstream side) with respect to cylinder axis CS1. Specifically, the total length of reducing agent evaporation plate 40 in right circumferential space 18R in the cylinder-axis direction shortens from length VL0 to length VL1 (see FIG. 10).

(Guide Plate 50)

Guide plate 50 is bent at central part 51 in the cylinder-axis direction, similarly to pipe 20 bent at the central part in the pipe-axis direction (bent part PS1). Guide plate 50 extends radially from the 12 o'clock position of pipe peripheral wall 22 to cylindrical wall 12, with radial-direction one side being connected to cylindrical wall 12 and the radial-direction other side being connected to pipe peripheral wall 22. Guide plate 50 blocks the movement of the exhaust gas and ammonia that have moved from left circumferential space 18L (see FIG. 6) to right circumferential space 18R (see FIG. 6) so that the exhaust gas and ammonia do not return from right circumferential space 18R to left circumferential space 18L. Note that the exhaust gas and ammonia move, in right circumferential space 18R, from the other side to the one side in the cylinder-axis direction.

While guide plate 50 blocks the movement of the exhaust gas and ammonia from right circumferential space 18R to left circumferential space 18L, guide plate 50 guides the exhaust gas and ammonia that have moved toward the one side in the cylinder-axis direction in right circumferential space 18R, from right circumferential space 18R toward inlet 24.

The exhaust gas and ammonia guided to inlet 24 enter a position on one side of the pipe axis of pipe 20, move from this position to a position on the other side of the pipe axis, and are discharged from outlet 26 to the outside of chamber 10. A diffusion chamber is connected to chamber 10 to diffuse the exhaust gas and ammonia (see FIG. 1). This causes ammonia to react with nitrogen oxides contained in the exhaust gas, and the nitrogen oxides are reduced to nitrogen and water in the reaction process.

Exhaust treatment apparatus 100 according to the present embodiment is for reducing nitrogen oxides contained in exhaust gas by mixing, with a reducing agent, the exhaust gas discharged from an internal combustion engine, exhaust treatment apparatus 100 including: chamber 10 that includes cylindrical wall 12 and cylinder axis CS1 and includes one-side end and another-side end in the cylinder-axis direction, the one-side end including inlet port 16 for introducing the exhaust gas, the another-side end being closed; pipe 20 that includes: pipe peripheral wall 22; pipe axis PS; inlet 24 provided in one-side portion of the pipe axis; and outlet 26 provided in another-side portion of the pipe axis and positioned outside the chamber, pipe 20 being disposed so that circumferential space 18 is formed along cylindrical wall 12 in the circumferential direction by being surrounded by cylindrical wall 12 from the outside; injector 30 that injects the reducing agent from the side of cylindrical wall 12 toward circumferential space 18; and guide plate 50 that guides the exhaust gas and the injected reducing agent from the side of circumferential space 18 toward inlet 24.

With the above configuration, the exhaust gas flows along the outer circumference direction of pipe 20. The entire pipe peripheral wall 22 of pipe 20 can be efficiently heated by the heat of the exhaust gas flowing along the outer circumference direction of the pipe, thereby efficiently promoting the evaporative decomposition of the reducing agent passing through pipe 20.

Exhaust treatment apparatus 100 in the above embodiment further includes reducing agent evaporation plate 40 disposed in circumferential space 18 so that the injected reducing agent comes into contact with reducing agent evaporation plate 40, and guide plate 50 guides the exhaust gas and the reducing agent that has been evaporated by being in contact with reducing agent evaporation plate 40, from the side of circumferential space 18 toward inlet 24. Accordingly, reducing agent evaporation plate 40 is disposed so that the reducing agent comes into contact with reducing agent evaporation plate 40, and thus it is possible to further efficiently promote the evaporative decomposition of the reducing agent.

In exhaust treatment apparatus 100 of the above embodiment, reducing agent evaporation plate 40 is disposed along cylindrical wall 12. Thus, the area of reducing agent evaporation plate 40 can be widened along cylindrical wall 12, and the evaporative decomposition of the reducing agent is promoted depending on the widened area, so that the evaporative decomposition of the reducing agent can be sufficiently performed.

In exhaust treatment apparatus 100 in the above embodiment, one-side portion of the pipe axis extends along the cylinder axis, inlet 24 is provided in pipe peripheral wall 22 in the one-side portion of the pipe axis, and the other side portion of the pipe axis extends in a direction is inclined at a predetermined angle with respect to the cylinder axis. Thus, adjusting the direction in which the other side portion of the pipe axis is inclined allows for corresponding to the layout variation of exhaust treatment apparatus 100 set for each vehicle type.

In exhaust treatment apparatus 100 of the above embodiment, guide plate 50 extends radially from pipe peripheral wall 22 to cylindrical wall 12, a radial-direction one side is connected to cylindrical wall 12, and the radial-direction other side is connected to pipe peripheral wall 22. This allows the reducing agent flowing to the side of cylindrical wall 12 to be guided to the side of pipe peripheral wall 22 together with the exhaust gas, and allows the guided reducing agent to be guided, together with the exhaust gas, to inlet 24 provided in pipe peripheral wall 22.

(Variations)

Figure 11:
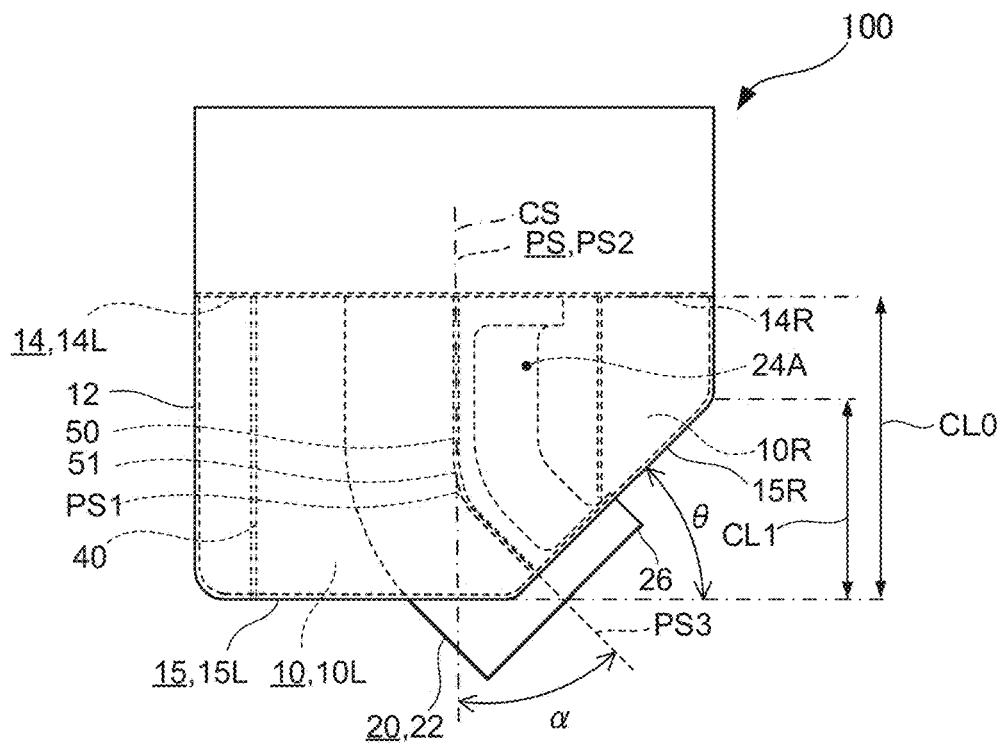
FIG. 11 is a plan view of an exhaust treatment apparatus according to a variation of the present embodiment.
Figure 12:
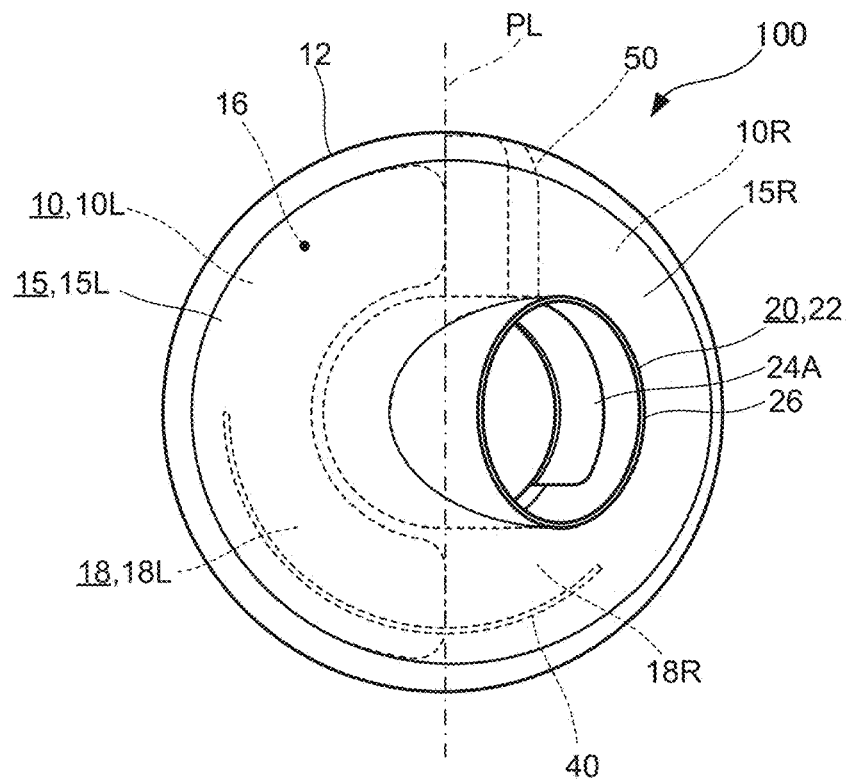
FIG. 12 is a front view of the exhaust treatment apparatus according to the variation of the present embodiment as viewed from the exhaust downstream side.
Figure 13:
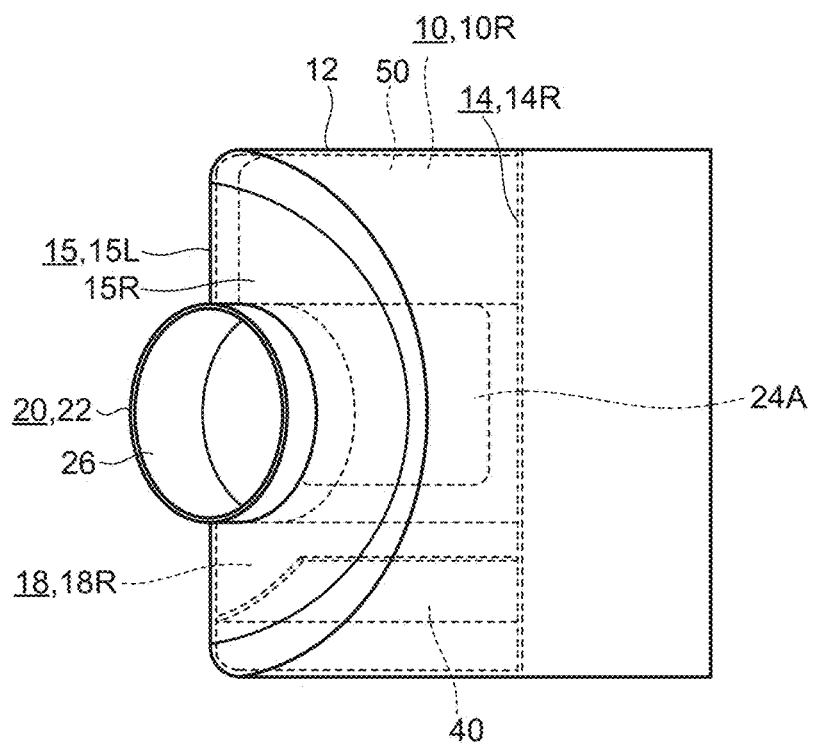
FIG. 13 is a right-side view of the exhaust treatment apparatus according to the variation of the present embodiment.
Figure 14:
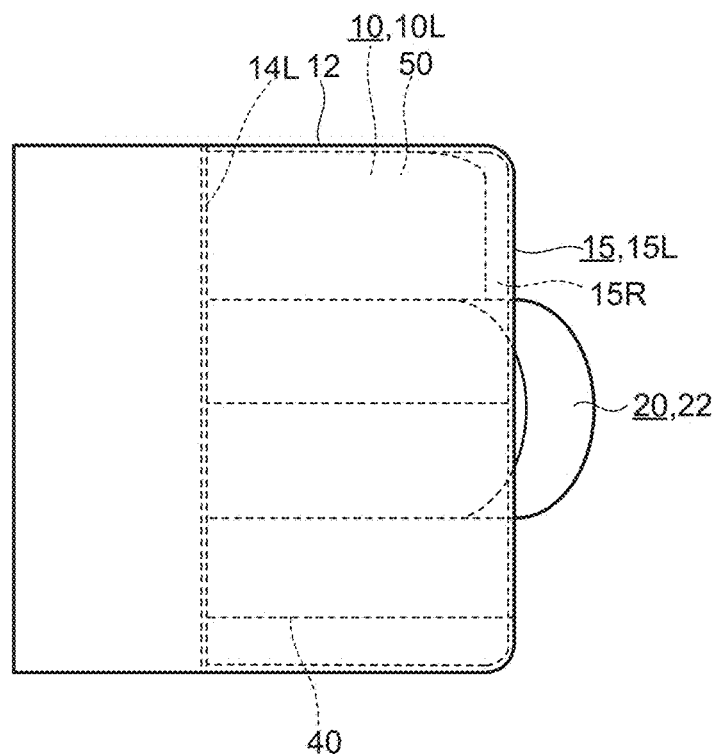
FIG. 14 is a left-side view of the exhaust treatment apparatus according to the variation of the present embodiment.
Figure 15:
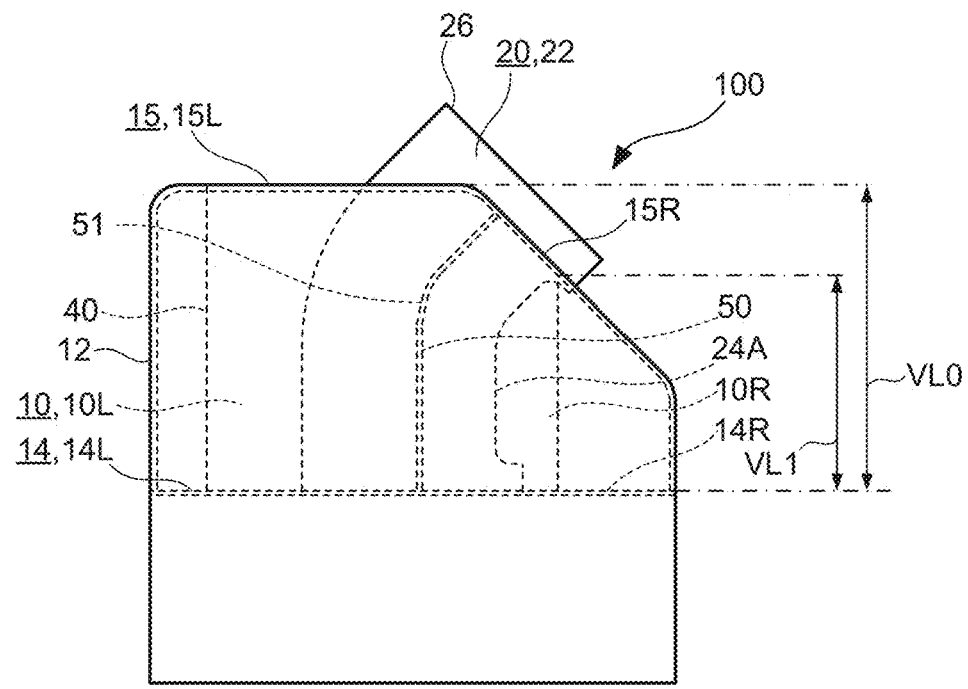
FIG. 15 is a bottom view of the exhaust treatment apparatus according to the variation of the present embodiment.
Figure 16:
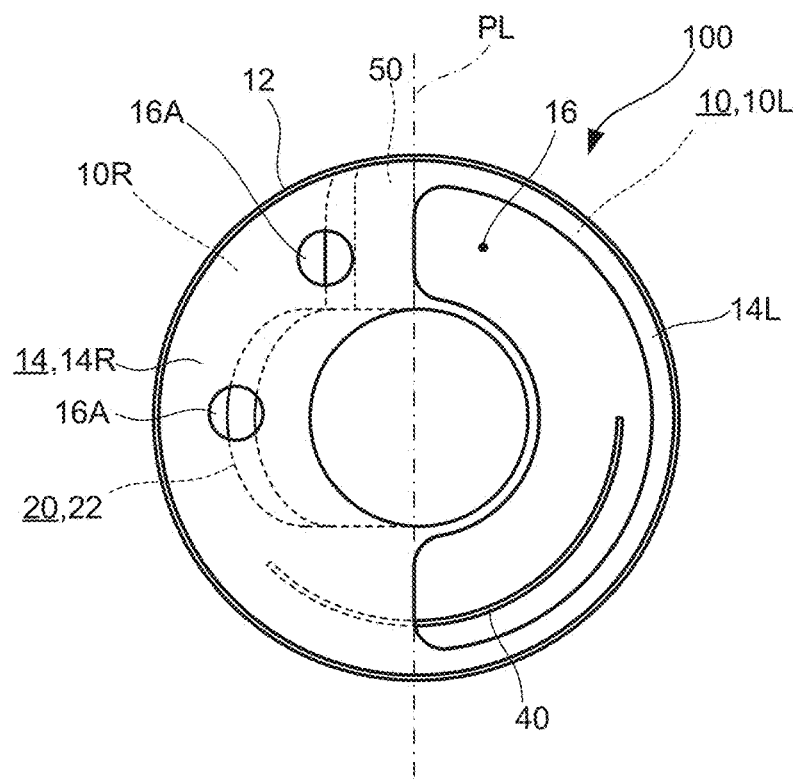
FIG. 16 is a rear view of the exhaust treatment apparatus according to the variation of the present embodiment as viewed from the exhaust upstream side.

Next, exhaust treatment apparatus 100 according to a variation of the present embodiment is described with reference to FIGS. 11 to 16. FIG. 11 is a plan view of an exhaust treatment apparatus according to a variation of the present embodiment. FIG. 12 is a front view of the exhaust treatment apparatus according to the variation of the present embodiment. FIG. 13 is a right-side view of the exhaust treatment apparatus according to the variation of the present embodiment. FIG. 14 is a left-side view of the exhaust treatment apparatus according to the variation of the present embodiment. FIG. 15 is a bottom view of the exhaust treatment apparatus according to the variation of the present embodiment. FIG. 16 is a rear view of the exhaust treatment apparatus according to the variation of the present embodiment. In the variation, configurations different from those of the above-described embodiment are mainly described, and the same components are denoted by the same reference numerals, and descriptions thereof are omitted.

In the above-described embodiment, inlet 24 of pipe 20 is provided in pipe peripheral wall 22 in pipe-axis-direction one-side part PS2. In contrast, in the variation illustrated in FIGS. 11 to 16, inlet 24A is provided so as to extend from pipe-axis-direction one-side part PS2 to pipe-axis-direction other-side part PS3. This allows the exhaust gas and the reducing agent that have moved from left chamber part 10L to right chamber part 10R to be introduced into pipe 20.

Further, in the above-described embodiment, inlet port 16 for introducing the exhaust gas from DPF into chamber 10 is provided in left wall 14L and is not provided in right wall 14R. In contrast, in the variation, inlet port 16 is provided in left wall 14L, and inlet holes 16A for introducing the exhaust gas into chamber 10 are provided in right wall 14R. This makes it possible to reduce the exhaust pressure loss in chamber 10.

Note that, in exhaust treatment apparatus 100 in the above-described embodiment, chamber 10, pipe 20, and guide plate 50 are applied as components composing SCR, but may be applied as components composing another exhaust treatment apparatus such as DPF.

The above-described embodiment is merely an example of implementation of the present disclosure, and the technical scope of the present disclosure should not be construed as limited by the embodiment. That is, the present disclosure can be implemented in various forms without departing from its spirit or key features.

INDUSTRIAL APPLICABILITY

The present disclosure is suitably used for a vehicle including an exhaust treatment apparatus that is required to efficiently promote the evaporative decomposition of a reducing agent.

The invention claimed is:

1. An exhaust treatment apparatus for reducing nitrogen oxides contained in exhaust gas by mixing, with a reducing agent, the exhaust gas discharged from an internal combustion engine, the exhaust treatment apparatus comprising:
a chamber that includes a cylindrical wall extending in a cylinder-axis direction and includes one-side end and another-side end in the cylinder-axis direction, the one-side end including an inlet port for introducing the exhaust gas, the another-side end being closed;
a pipe that includes: a pipe peripheral wall extending in a pipe-axis direction; an inlet provided in one-side portion of a pipe axis; and an outlet provided in another-side portion of the pipe axis and positioned outside the chamber, the pipe being disposed so that a circumferential space is formed between the cylindrical wall and the pipe peripheral wall by being surrounded by the cylindrical wall from an outside;
an injector that injects the reducing agent toward the circumferential space; and
a guide plate that guides the exhaust gas and the injected reducing agent from a side of the circumferential space toward the inlet.

2. The exhaust treatment apparatus according to claim 1, further comprising a reducing agent evaporation plate that is disposed in the circumferential space so that the injected reducing agent comes into contact with the reducing agent evaporation plate, wherein
the guide plate guides the exhaust gas and the reducing agent that has been evaporated by being in contact with the reducing agent evaporation plate, from the side of the circumferential space toward the inlet.

3. The exhaust treatment apparatus according to claim 2, wherein
the reducing agent evaporation plate is disposed along the cylindrical wall.

4. The exhaust treatment apparatus according to claim 2, wherein
a gap is provided between the reducing agent evaporation plate and the cylindrical wall.

5. The exhaust treatment apparatus according to claim 1, wherein
the one-side portion of the pipe axis extends along the cylindrical-axis direction,
the inlet is provided in the pipe peripheral wall in the one side portion of the pipe axis, and
the another-side portion of the pipe axis extends in a direction inclined at a predetermined angle with respect to the cylinder-axis direction.

6. The exhaust treatment apparatus according to claim 1, wherein
the guide plate extends radially from the pipe peripheral wall to the cylindrical wall, one side of the guide plate in a radial direction is connected to the cylindrical wall, and another side of the guide plate in the radial direction is connected to the pipe peripheral wall.

* * * * *